Dec. 11, 1934.    M. H. KOTZEBUE    1,983,762
FRACTIONATING APPARATUS
Filed Sept. 12, 1933    2 Sheets-Sheet 1

Inventor
M. H. Kotzebue
By Frease and Bishop
Attorneys

Patented Dec. 11, 1934

1,983,762

UNITED STATES PATENT OFFICE 1,983,762

FRACTIONATING APPARATUS

Meinhard H. Kotzebue, Tulsa, Okla.

Application September 12, 1933, Serial No. 689,104

5 Claims. (Cl. 261—114)

The invention relates in general to apparatus for separating gases or vapors from gases and gases from liquids, which apparatus may include fractionating towers, vapor towers, absorbers, evaporators and the like.

More particularly, the invention relates to any of such apparatuses employing bubbler units for increasing the surface contact between the gases being absorbed or condensed and the absorbing or condensing medium.

In the conventional type of apparatus employing bubbler units, as for instance, an absorber tower having a series of spaced bubbler supporting trays or plates, the efficiency of each bubble tray is dependent upon the amount of its absorption of the heavier fractions in the gases.

In conventional gasoline refinery bubble towers, the relatively low efficiency of the bubble trays sometimes requires redistillation in order to obtain the desired fractionation of the products.

Prior attempts have been made to provide for increasing the capacity of the absorbing medium, but these attempts have entailed an objectionable amount of entrainment of liquid particles which destroys the efficiency of the fractionation desired.

In other words, the entrained particles, being thoroughly fractionated, should be carried downward in the tower to the tray below, but in prior fractionating apparatus large quantities of the entrained particles are carried upward to the tray above.

It is therefore an object of the present invention to provide, in a bubble type of separating apparatus, means for greatly reducing the entrainment of liquid particles in the gases passing to the bubble trays, by returning the separated liquid to the second tray below to obtain the proper balance of partial pressures of the liquid on each tray.

Another object is to provide improved means for further separating entrained particles of liquid from the gases after the gases have passed through all of the bubbler units, and before the gases leave the apparatus.

In actual practice, I have found that by utilizing the present improvements, the efficiency per bubble tray is increased to over 90% as against approximately 50% attained in the conventional type of apparatus when operating on a capacity load of gases or vapor.

A further object is to provide means for separating entrained particles of liquid from gases passing through bubble type apparatus, which means is readily adapted for use in connection with the conventional bubble type apparatus without involving excessive difficulty and expense.

These and other objects are accomplished by the improvements comprising the present invention, which may be stated in general terms as including the provision of an extractor tray immediately below each bubble tray for separating entrained particles of liquid from the gases passing into said bubble tray from the bubble tray immediately thereunder, and means for returning the separated liquid to the second bubble tray below, and the provision of extracting means in the upper part of the separating apparatus for separating entrained particles of liquid from the gases after they have passed through all of the bubble trays and before the gases leave the tower.

Referring to the drawings forming part hereof,

Similar numerals refer to similar parts throughout the drawings.

Figure 1:
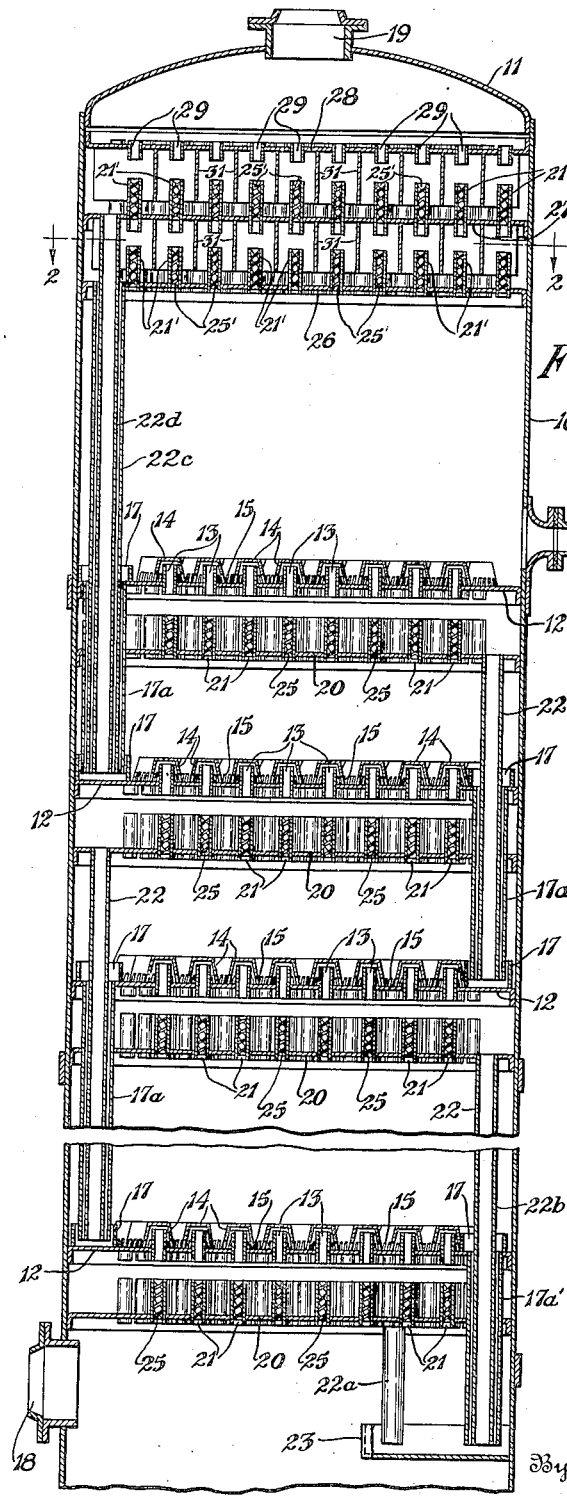
Figure 1 is a fragmentary vertical sectional view of a bubble absorber tower embodying the present improvements.
Figure 5:
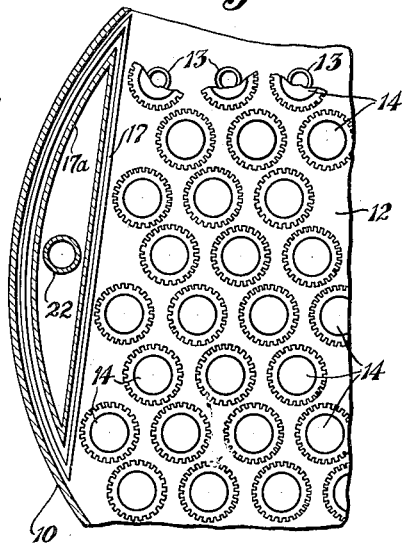
Fig. 5 is a plan view thereof.

For convenience I have shown the present improvements as applied to a bubble tower adapted for absorbing gasoline vapors from natural gases or from heavier hydrocarbons, but it is to be understood that the present improvements may be equally well applied to other forms of fractionating apparatus, without departing from the scope of the invention as defined in the claims.

The bubble tower indicated in the drawings includes the shell or outer wall 10, and the dome-shaped head 11. Within the shell 10 a plurality of vertically spaced bubble trays or plates 12 are secured at intervals. The trays 12 preferably extend transversely across the entire interior of the shell 10, and are preferably secured at their outer edges to the shell.

Each of the trays 12 is provided with a plurality of bubbler units comprising preferably circular openings through which upstanding tubes or chimneys 13 extend, said tubes being secured to the tray. Preferably the open upper ends of the tubes 13 extend a substantial distance above the tray 12 in which they are secured and the open lower ends extend a substantial distance below said tray.

Each tube or chimney 13 has its open upper end disposed within a preferably frusto-conical cap 14, and the lower edge portion of each cap is slotted as shown at 15, and in contact with the upper surface of supporting tray 12.

An oil inlet 16 is provided in the shell 10, preferably above the topmost tray 12 for introducing an absorbing medium, such as mineral oil. Each tray 12 is provided at opposite sides with overflow cups or weirs 17 for maintaining a level of oil on the tray, and preferably within one of said cups is an overflow pipe 17a for conducting the overflow oil to an overflow cup at one side of the bubble tray 12 next below.

It will be understood that instead of conducting the overflow oil downward through the downcomer pipes 17a, the same may be accomplished by withdrawing the overflow oil out through the side and then re-conducting it to the bubble tray below, without departing from the scope of the invention.

Figure 4:
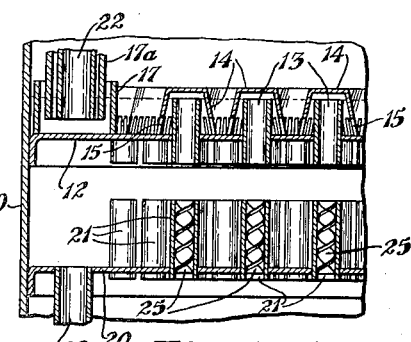
Fig. 4 is an enlarged fragmentary sectional view of one of the bubble trays and the extracting means located immediately thereunder.
Figure 2:
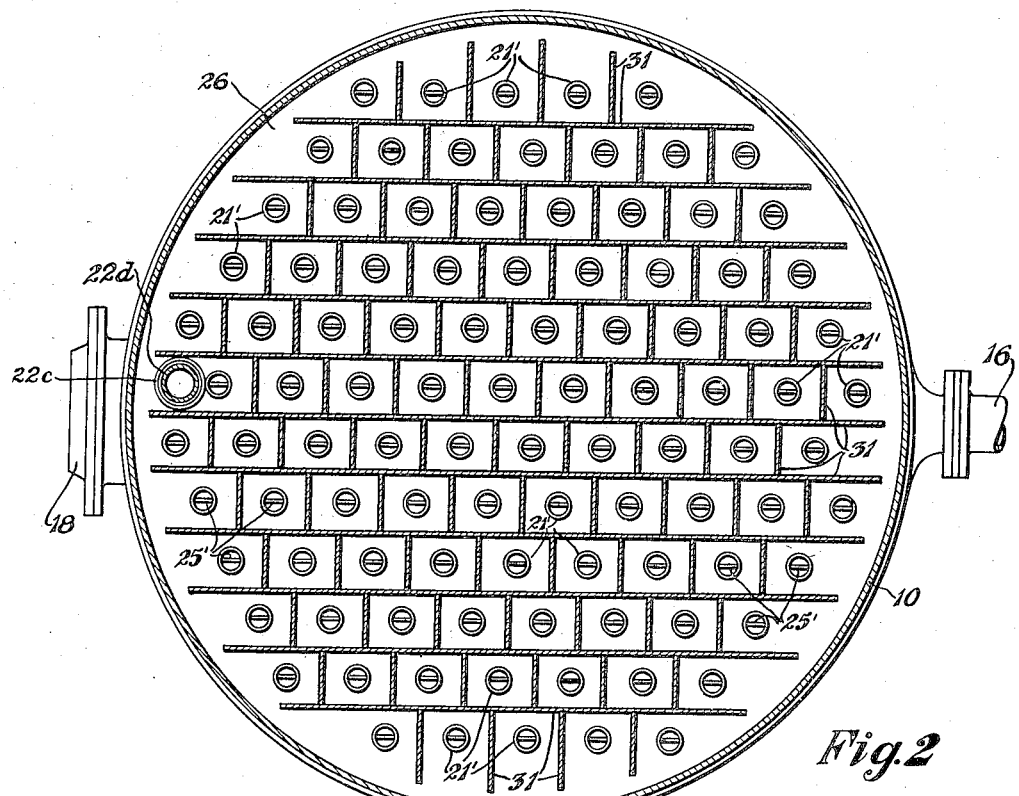
Fig. 2 is a cross sectional view, as on line 2—2, Fig. 1.
Figure 3:
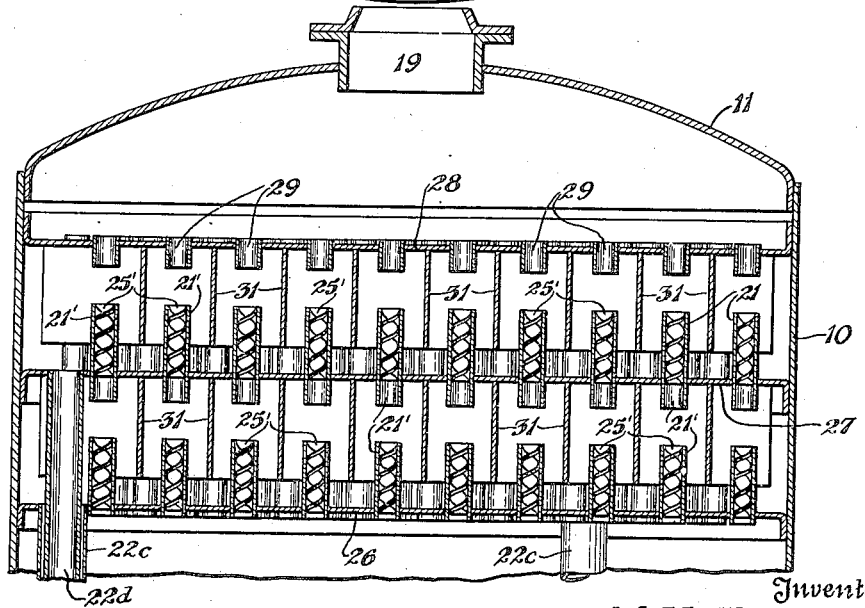
Fig. 3 is an enlarged fragmentary sectional view of the top portion of the tower.

The bubble trays with their overflow cups and overflow pipes are similar to the conventional arrangement in bubble towers, so that by introducing a stream of absorbing oil at the inlet 16, a layer of the oil will be maintained on each of the series of bubble trays 12 throughout the tower. The relative level of each layer of oil is indicated by the dot-dash line in Fig. 4.

The gases to be treated are introduced at the bottom portion of the tower through the inlet 18, which is preferably located below the bottom bubble tray, and circulate upwardly through the successive bubble trays 12, where more or less of the entrained particles of liquid are absorbed by the layers of oil, the gases discharging out of the gas outlet 19 at the top of the tower.

The present invention includes means for greatly reducing the amount of entrained liquid particles in the gases passing to the bubble trays, without materially decreasing the pressure of the gases, so as to improve the efficiency of the tower or apparatus as a whole.

This means includes extractor trays 20 preferably secured to the shell 10 at vertically spaced intervals, and located one below each bubble tray 12 and above the bubbler units of the next bubble tray below. Each tray 20 is provided with extractor units comprising openings having secured therein upstanding extractor tubes 21, open at both ends and in register with the tubes 13 of bubble tray immediately above. Preferably, the upper ends of the tubes project a substantial distance above their supporting tray 20 so that said upper ends terminate a relatively short distance below the lower ends of the registering bubble tubes 13, and discharge directly thereinto.

Each extractor tray 20 is provided at one side with an overflow or downcomer pipe 22 having its open upper end secured in an opening in the tray, the upper end of the pipe 22 being preferably flush with the upper surface of the tray. The downcomer pipe 22 extends downward through the bubble tray next below and through the extractor tray below and adjacent thereto, and the open lower end of the pipe 22 preferably terminates within the overflow cap of the bubble tray next below the latter. Preferably, each pipe 22 extends through the overflow pipe 17a of the bubble tray next below, and each overflow pipe 17a extends downward from its bubble tray through the extractor tray next below.

Consequently, any particles of liquid deposited upon one of the trays 20 are carried downward into the overflow cup of the second bubble tray 12 below said extractor tray 20, so that said particles introduced onto said bubble tray together with the downcoming absorbing medium being conducted onto said bubble tray.

Preferably, the downcomer pipes 22a and 22b of the two lowest extractor trays discharge into a general overflow cup 23, into which the overflow pipe 17a' of the lowest bubble tray also discharges.

Each of the extractor tubes 21 is provided with means for causing an outwardly whirling movement of gases passing therethrough, said means comprising preferably a strip of flat twisted metal 25 held in the tube as by a driving fit. As the gases pass through the tubes 21, the whirling movement imparted thereto imparts a centrifugal motion to the liquid droplets entrained or carried by the gases.

The space provided between the upper end of each tube 21 and the lower end of the registering bubble tube 13 located immediately above enables the whirling droplets of liquid to be thrown out centrifugally into the dead gas space provided midway between the extractor tubes and thence deposited and substantially uniformly distributed on the extractor tray 20 immediately below, whence they are collected and carried downward by the downcomer pipe 22 connected thereto to the second bubble tray below, and the droplets are thus separated from the gases without materially decreasing the pressure thereof, because the partial pressures of the liquid in each tray are properly balanced.

Thus the extracting means between each pair of bubble trays, comprising an extractor tray with its extractor tubes each having whirl producing means and a downcomer pipe, provides for greatly reducing the entrainment of liquid particles in the gases circulating between said bubble trays. Consequently, the efficiency of the tower as a whole is greatly improved.

Means for further separating entrained particles of liquid from the gases after the gases have passed through the last or topmost bubble tray preferably includes extracting means located in the top portion of the tower.

This final extraction may be carried out by providing a series of spaced extractor trays, which may be three in number, indicated at 26, 27 and 28 respectively. Each of the lower two trays 26 and 27 are provided with open end extractor tubes 21', similar to tubes 21, and having the twisted strips 25' therein.

The extractor tubes of the lowest tray 26 are in register with and spaced a relatively short distance below the tubes of the tray 27, so that space is provided for allowing the outwardly whirling droplets of liquid to deposit upon the tray 26. Also, the upper ends of the tubes in the tray 26 discharge directly into the lower ends of the tubes in tray 27.

The upper tray 28 is provided with a plurality of open tubes 29 in register with the extractor tubes 21' of the tray 27, and the upper ends of the said tubes 21' are spaced from the lower ends of tubes 29, to allow for deposition of the liquid droplets on tray 27.

The tubes 21' of tray 26 are in direct communication with the tubes 21' of tray 27, and the tubes 21' of tray 27 are in direct communication with the tubes 29 of tray 28, so that the gases have a free and unrestricted flow from one set of tubes to another in order to promote deposition of the outwardly whirling particles on the trays.

A downcomer pipe 22c is provided for tray 26 for carrying the liquid droplets therefrom downward through the overflow pipe of the top bubble tray into the overflow cup 17 on the second bubble tray 12 below, from which overflow cup the droplets drain into the layer of absorbing medium on said bubble tray. A downcomer pipe 22d located inside of pipe 22c is likewise provided for tray 27 and extends downward through tray 26, thence through the overflow pipe 17a of the top bubble tray, and terminates within the overflow cup 17 of the second bubble tray below.

Preferably, each of the trays 27 and 28 are provided with downwardly extending partition or baffle walls 31 forming a rectangular box-like structure around each of the tubes 21' of tray 26 and tray 27, respectively. The walls 31 extending downward from tray 27 terminate at points spaced above tray 26 and below the tops of the tubes 21' supported thereby, and the walls 31 extending downward from tray 28 terminate at points spaced above tray 27 and below the tops of the tubes 21' supported thereby.

Thus the box-like structures formed by walls 31 prevent the whirling droplets emerging from the tubes 21' from interfering with each other.

In the operation of the improved apparatus, the gases to be treated are introduced under pressure at the bottom portion of the tower through the gas inlet 18, and circulate therefrom upwardly through the spaced series of extractor and bubble trays. As the gases pass through each bubble tray, they bubble up through the layer of oil contained thereon, and a proportion of the liquid particles entrained or carried by the gases is absorbed by the layer of absorbing medium.

As the gases pass from one bubble tray to another through the extractor tubes 21 at a relatively high velocity, the twisted plates 25 cause an outwardly whirling movement of the gases and the particles of liquid still entrained therein. As the gases leave the upper ends of the extractor tubes 21 they emerge into the space provided between those tubes and the adjacent registering bubble tubes 13.

In this space the rapidly whirling particles or droplets of liquid are thrown out by centrifugal action and dropped downwardly through the dead gas spaces midway between the tubes 21 to be deposited and distributed upon the extractor tray. The gases, being lighter, are carried upward into the registering bubble tubes and bubble out through the slotted openings of the bubble caps under the layer of absorbing medium carried on the bubble tray located immediately above.

By providing the improved extracting means below each of a series of bubble trays, the entrained particles of liquid are substantially completely removed from the gases by the time they have passed through the whole series of bubble trays.

After the gases leave the last or topmost bubble tray, they pass through the registering extractor tubes 21' of the extractor trays 26 and 27, which are located in the top portion of the tower, for removing any liquid particles still entrained in the gases.

The gases, which are now substantially free from any liquid particles, then pass upwardly through the open tubes 29 of the top tray 28 and pass out of the tower through the outlet 19.

I claim:—

1. In fractionating apparatus, a plurality of spaced trays each provided with a plurality of tubes, the tubes of each tray being in register with the tubes of the adjacent tray and the adjacent ends of said registering tubes being spaced from and in direct communication with each other, means for circulating gases through said tubes, means in the tubes of one tray for causing whirling movement of the gases passing therethrough, and baffle means surrounding the discharging end of each tube having the whirl-causing means.

2. In fractionating apparatus, spaced trays including an upper tray, a lower tray, and an intermediate tray, a plurality of upstanding tubes in each tray in register with the tubes in the other trays, the adjacent ends of said registering tubes being spaced from and in direct communication with each other, means for circulating gases through said registering tubes, means in each of the tubes of the lower and intermediate trays for causing whirling movement of the gases passing therethrough, and baffle means surrounding the upper ends of the tubes of the intermediate and lower trays.

3. Fractionating apparatus including a series of vertically spaced bubble trays having bubbler units thereon, means for circulating gases successively through the bubble trays, an extractor tray located below each bubble tray and above the bubbler units of the next bubble tray below, whirl-producing extractor tubes in each extractor tray for separating entrained particles of liquid from gases passing therethrough and substantially uniformly distributing said particles on said tray, the upper end of each extractor tube being adjacent and discharging directly into one of the bubbler units on the next bubble tray above, and means associated with each extractor tray for conducting said separated liquid to the second bubble tray below.

4. Fractionating apparatus including a series of vertically spaced bubble trays having bubbler units thereon, means for circulating gases successively through the bubble trays, an extractor tray located below each bubble tray and above the bubbler units of the next bubble tray below, extractor tubes extending through and above each extractor tray and having their upper ends adjacent and discharging directly into the bubbler units of the next bubble tray above, the extractor tubes of each extractor tray being adapted for causing a whirling movement of gases passing therethrough for separating entrained particles of liquid and substantially uniformly distributing them on said extractor tray, and a downcomer pipe associated with each extractor tray for conducting said separated liquid to the second bubble tray below.

5. Fractionating apparatus including a series of vertically spaced bubble trays having bubbler units thereon, means for circulating gases upwardly through all of the bubble trays, means for introducing a gas absorbing medium onto the top bubble tray, means for conducting absorbing medium from each bubble tray to one side of the next bubble tray below, an extractor tray located below each bubble tray, whirl-producing extractor tubes in each extractor tray for separating entrained particles of liquid from gases passing therethrough and substantially uniformly distributing said particles on said tray, the upper end of each extractor tube being adjacent and discharging directly into one of the bubbler units on the next bubble tray above, and means for conducting the separated liquid collected on each extractor tray downwardly and introducing it onto the second bubble tray below at the side thereof where the downcoming absorbing medium is conducted onto said tray.

MEINHARD H. KOTZEBUE.